March 17, 1964     H. G. ADLER     3,124,963
SPEED RESPONSIVE DEVICES
Filed May 31, 1962     3 Sheets-Sheet 1
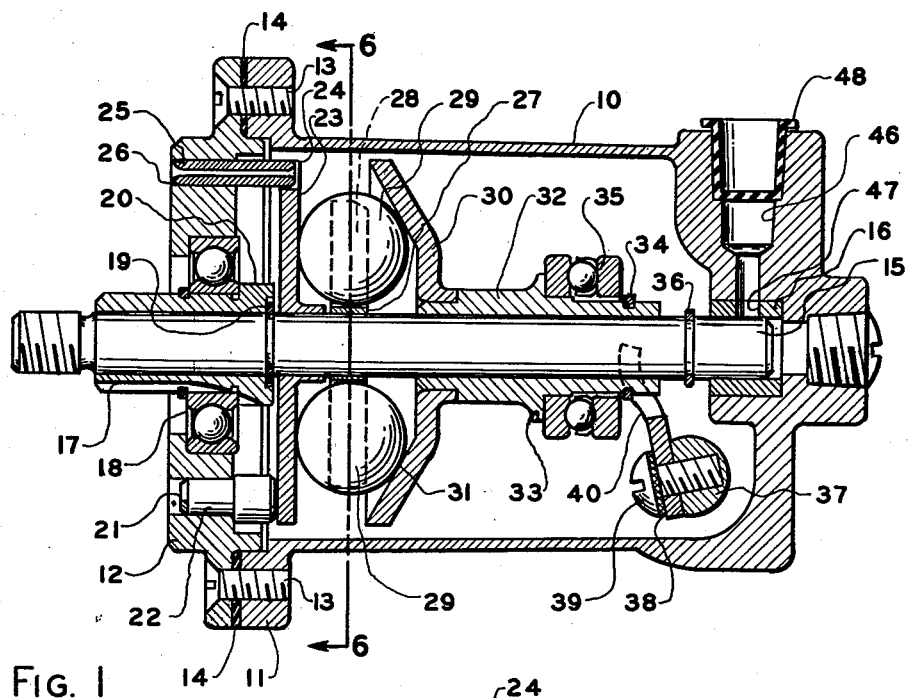
FIG. 1
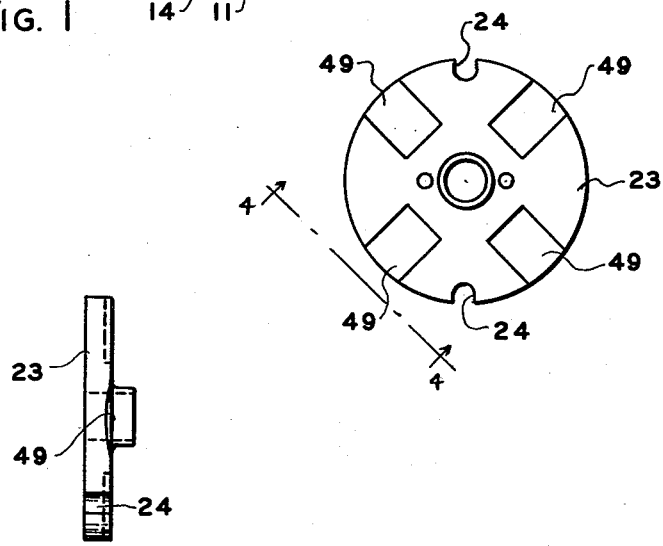
FIG. 3
FIG. 4
INVENTOR.
HERMAN G. ADLER
BY
ATTORNEYS March 17, 1964 H. G. ADLER 3,124,963
SPEED RESPONSIVE DEVICES
Filed May 31, 1962 3 Sheets-Sheet 2

INVENTOR.
HERMAN G. ADLER
BY
ATTORNEYS

March 17, 1964  H. G. ADLER  3,124,963
SPEED RESPONSIVE DEVICES
Filed May 31, 1962  3 Sheets-Sheet 3

INVENTOR.
HERMAN G. ADLER
BY
*Hauke & Hauke*
ATTORNEYS

United States Patent Office 3,124,963
Patented Mar. 17, 1964

3,124,963
SPEED RESPONSIVE DEVICES
Herman G. Adler, Detroit, Mich., assignor to Continental Motors Corporation, Muskegon, Mich., a corporation of Virginia
Filed May 31, 1962, Ser. No. 199,031
13 Claims. (Cl. 73—551)

This invention relates to speed responsive devices and more particularly to such a device in which the speed responsive element must repeatedly assume the same position at the same speed within very small tolerances and in which the device is required to respond to extremely small changes in speed.

The speed responsive device of the present invention has application in many ways, but in the present application is shown as used in the control of the speed of internal combustion engines which are being used to drive generators or related equipment. Exacting specifications are often placed on the performance of such an engine. For example the specifications may require that the difference in engine speed when it operates at a rated load and when it operates without any load is not to exceed 3% above a rated speed. Also, that at any load between rated and no load the speed is to be maintained constant within plus or minus one-third of one percent of the rated speed. The specifications may further provide that when the load is repeatedly changed from any load to a given load, stable operation must be established within not more than four seconds after which the variation in speed under the given load must not exceed plus or minus one-third of 1 percent of the rated speed. When a speed responsive device utilizes centrifugal force as a speed sensing function it becomes very difficult to provide a structure to fulfill these specifications since this would require almost complete freedom from friction.

It is an object of the present invention to improve speed responsive devices by providing means substantially eliminating the detrimental effects of friction on the performance of such a device.

It is yet another object of the present invention to produce a speed responsive device which will respond to extremely small changes in speed and in which the speed responsive elements will repeatedly assume the same position at the same speed within very small limits by providing a means inducing a high frequency vibration in the speed sensing elements during rotation thereof.

It is still a further object of the present invention to reduce the cost of producing a highly sensitive speed responsive device by providing an easily fabricated member which substantially eliminates the detrimental effects of friction on the operation of such a device.

Still further objects and advantages will readily occur to one skilled in the art upon reference to the following drawings in which like reference characters refer to like parts throughout the several views and in which FIG. 1 is a longitudinal cross sectional view of a preferred embodiment of the present invention.

FIG. 3 is an elevational plan view of a ball race of the present invention.

FIG. 4 is an elevational view as seen substantially from the line 4—4 of FIG. 3.

Figure 2:
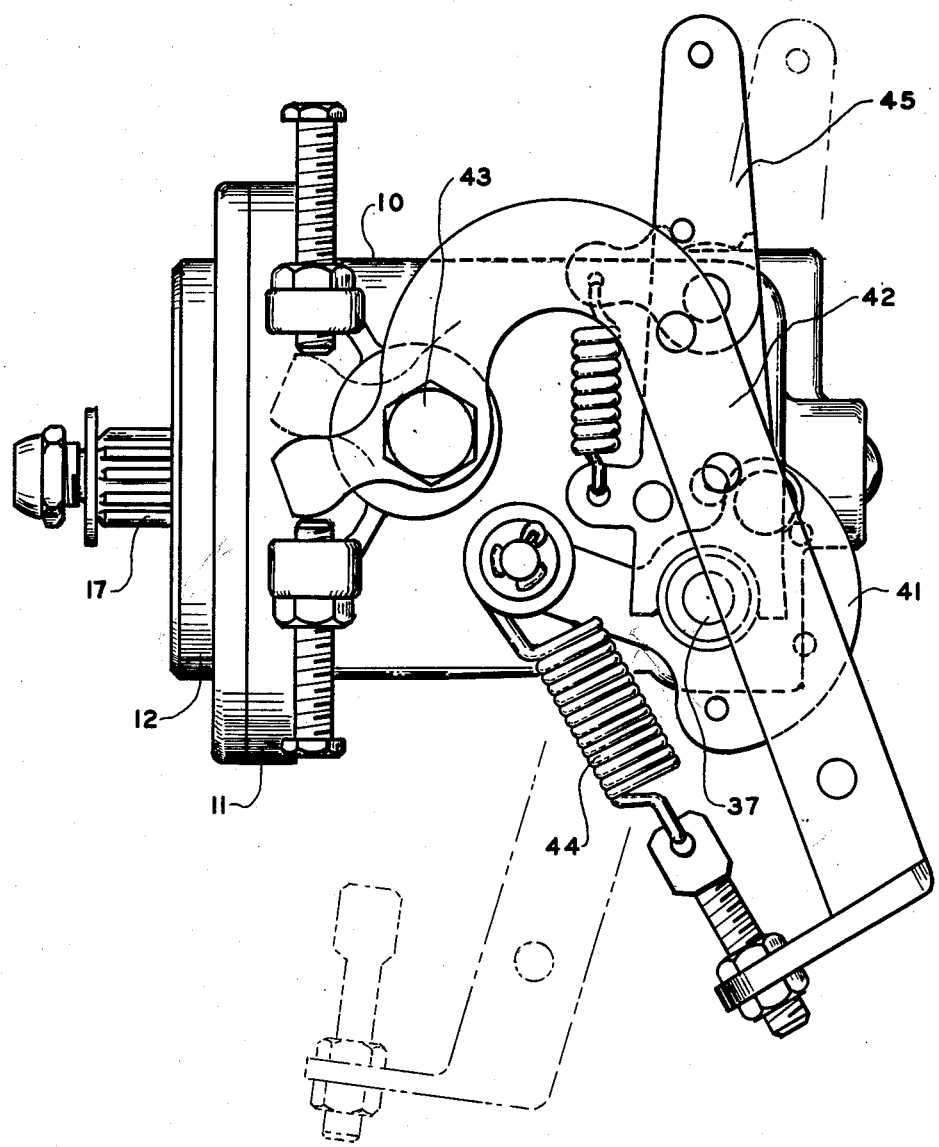
FIG. 2 is an elevational view of the embodiment illustrated in FIG. 1.

Now referring to the drawings for a more detailed description of the present invention, FIGS. 1 and 2 illustrate a preferred speed responsive device as comprising a substantially cylindrical housing 10 having at one end an outwardly extending peripheral flange 11. A base member 12 closes one end of the housing 10 and is secured to the flange 11 by any means such as screws 13. A gasket 14 is preferably provided between the flange 11 and the base member 12.

A drive shaft 15 is rotatably carried in the housing 10 by means of a bushing 16. A spline member 17 is secured to the opposite end of the drive shaft 15. Bearings 18 carried in the base member 12 rotatably support the spline member 17 and the drive shaft 15. A snap ring 19 and a flanged portion 20 of the spline member 17 cooperate to restrict relative axial movement between the drive shaft 15 and the spline member 17.

The base member 12 is provided with a plurality of annularly spaced perforations 21 each of which carries a base pin 22. The base pins 22 locate the position of a flat ball race 23 carried on the shaft 15. The flat ball race 23 is provided with peripheral slots 24. Pins 25 are seated in perforations 26 provided in the base member 12 and extend into the slots 24 to restrict the ball race 23 from rotating. Sufficient clearance is provided between the ball race 23 and the drive shaft 15 to permit the shaft 15 to freely rotate therein.

Figure 6:
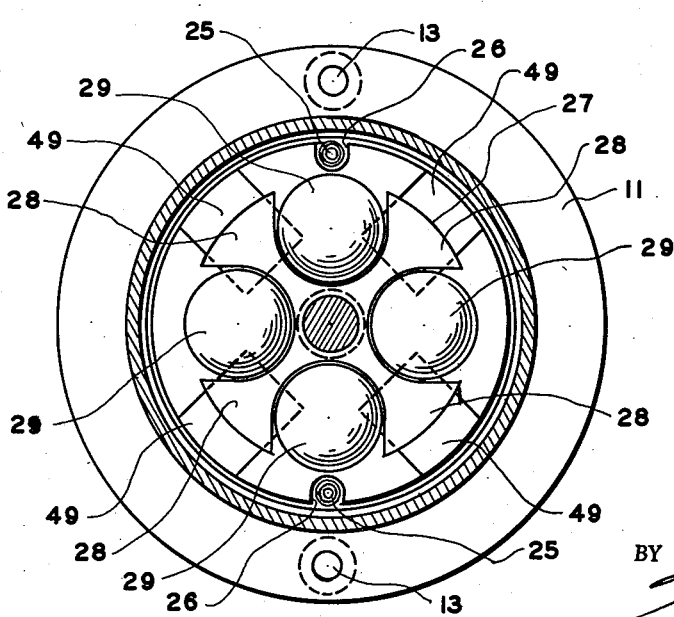
FIG. 6 is a cross-sectional view taken on the line 6—6 of FIG. 1.

As can be seen in FIG. 6 a drive member 27 is secured to the drive shaft 15 for rotation therewith and is provided with a plurality of radially extending arms 28. Centrifugal balls 29 are carried on the surface of the ball race 23 and intermediate the arms 28.

A ball race 30 is carried by the drive shaft 15 and is provided with a conical surface 31 engaging the balls 29. A tubular portion 32 of the ball race 30 is provided with an annular shoulder 33 which cooperates with a snap ring 34 to carry a bearing member 35 which permits relative rotation between the ball race 30 and the bearing member 35. The ball race 30 is freely carried on the drive shaft 15 to permit the ball race 30 to move axially along the shaft 15. A snap ring 36 is provided on the shaft 15 to limit the axial movement of the ball race 30.

A cross shaft 37 is rotatably carried in the housing 10 in a position having its longitudinal axis substantially normal to the longitudinal axis of the drive shaft 15. A fork member 38 is secured to the cross shaft 37 by any means such as a screw 39 and has an arm 40 which engages the upper surface of the bearing member 35.

As can best be seen in FIG. 2 an arm member 41 is carried on the cross shaft 37 exteriorly of the housing 10. A lever 42 is pivotally mounted to the housing 10 as at 43. A spring member 44 is adjustably secured between the arm member 41 and the lever 42 to urge the cross shaft 37 to rotate in a counterclockwise position as illustrated in FIG. 2. Throttle linkage 45 is also carried on the cross shaft 37.

As can best be seen in FIG. 1, the housing 10 is provided with an inlet 46 which communicates with a perforation 47 provided in the bushing 16 to permit oiling between the surface of the bushing 16 and the drive shaft 15. A plug member 48 is provided to close the inlet when not in use.

In operation the spline member 17 is operably connected to an internal combustion engine (not shown) and imparts rotation to the drive shaft 15 in accordance with the speed of the engine. The drive member 27 imparts rotation to the balls 29. Centrifugal force will then move the ball race 30 axially against the force of the spring member 44. Each axial position of the ball race 30 will produce a corresponding position of the throttle linkage 45 through the fork member 38 and the cross shaft 37. The bearing member 35 provides a non-rotating surface for the arm 40 to bear against.

FIGS. 3, 4 and 6 illustrate a detailed description of the ball race 23. The surface of the ball race 23 which engages the balls 29 is provided with a plurality of radially extending annularly spaced depressions 49. The number of depressions 49 is preferably equal to the number of balls 29 but the number may be more or less depending on the results desired. The depth of each depression 49 is quite small as compared to the width. In the preferred embodiment illustrated satisfactory results were attained when the ratio of the maximum depth of the depressions 49 to the width was in the range of from 2:380 to 6:380. The cross sectional contour of each depression 49 when examined on a line normal to a radius bisecting the depression is preferably in the form of a sine curve although satisfactory results have been attained when this contour is formed on a relatively large radius.

Since the drive member 27 is rigidly attached to the drive shaft 15 while the ball race 30 is rotatably and slidably mounted on the shaft 15, each ball 29 is caused to spin about its axis while rotating about the axis of the shaft 15. Simultaneously as the balls 29 move in a circular path they also move a minute amount up and down as they pass over the depressions 49 thereby causing the ball race 30 to vibrate at a high frequency. This results in the practical elimination of static friction and produces a device which meets very narrow requirements relating to percent difference in speed at rated and no load, stability at any load and recovery in a time interval considerably less than four seconds.

Figure 5:
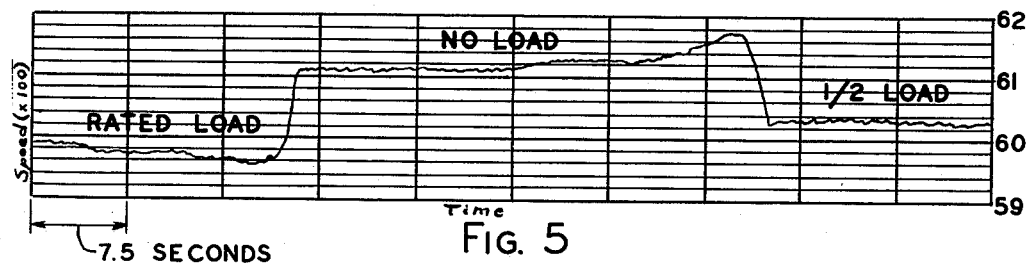
FIGS. 5 and 5A are charts illustrating the improved performance attained by a speed responsive device of the present invention.
Figure 5A:
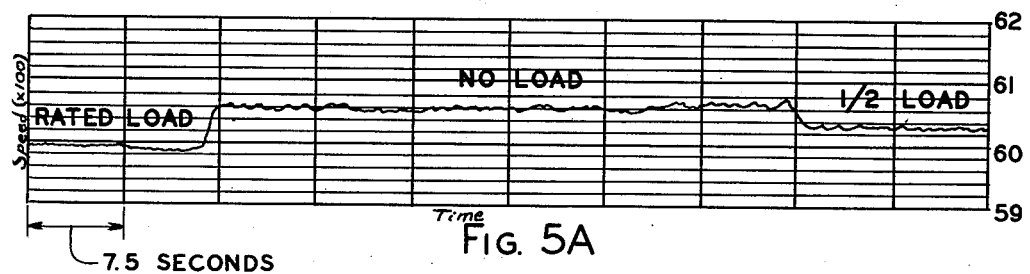

FIGS. 5 and 5A illustrate graphically the improved results achieved by the present invention. The performance of the governor without the ball race 23 of the present invention (FIG. 5) shows a recovery period varying from 10 to 14 seconds while a speed responsive device constructed according to the present invention conforms to the four seocnd recovery period limitation (FIG. 5A).

Although I have described but one embodiment of the present invention, it is apparent that changes and modifications may be made without departing from the spirit of the invention or the scope of the appended claims.

I claim:
1. A speed responsive device comprising
   (a) a housing,
   (b) a shaft rotatably carried in said housing,
   (c) a rotary drive member carried on said shaft,
   (d) centrifugal balls rotatably driven by said drive member about said shaft,
   (e) a first ball race axially slidably mounted on said shaft and having a dished surface engaging said balls,
   (f) resilient means urging said race to engage said balls,
   (g) a second ball race carried by said shaft in a position spaced from said first ball race and having a surface engaging said balls,
   (h) said surface being provided with a plurality of annularly spaced, radially extending depressions, and
   (i) means restricting rotation of said second ball race whereby upon rotation of said drive member a high frequency vibration is imparted to said balls.

2. The device as defined in claim 1 and in which each of said depressions is arcuate about a radius bisecting said depression.

3. The device as defined in claim 1 and in which each of said depressions when taken on a section normal to a radius bisecting said depression is contoured substantially in the form of a portion of a sine curve.

4. The device as defined in claim 1 and in which the number of said depressions is equal to the number of said balls.

5. The device as defined in claim 1 and in which the ratio of the maximum depth of said depressions to the width of said depressions is in the range of from 2:380 to 6:380.

6. A speed responsive device comprising,
   (a) a housing,
   (b) a shaft rotatably carried in said housing,
   (c) a first ball race axially slidably carried on said shaft in a position spaced from said housing,
   (d) a second ball race axially aligned with said first ball race and spaced therefrom,
   (e) means securing said second ball race to said housing to prevent rotation thereof,
   (f) a plurality of centrifugal balls carried intermediate said first and second ball races,
   (g) a rotary drive carried by said shaft and having radially extending arms engaging said balls,
   (h) said first ball race having a dished surface,
   (i) resilient means operable to urge said surface into engagement with said balls,
   (j) said second ball race having a surface engaging said balls, and
   (k) means being provided on said surface of said second ball race being operable to impart a high frequency vibration to said balls during rotation thereof.

7. A speed responsive device comprising
   (a) a housing,
   (b) a shaft rotatably carried in said housing,
   (c) a first ball race axially slidably carried on said shaft in a position spaced from said housing,
   (d) a second ball race axially aligned with said first ball race and spaced therefrom,
   (e) means securing said second ball race to said housing,
   (f) a plurality of centrifugal balls carried intermediate said first and second ball races,
   (g) a rotary drive member carried by said shaft and having radially extending arms engaging said balls,
   (h) said first ball race having a dished surface,
   (i) resilient means operable to urge said surface into engagement with said balls,
   (j) said second ball race having a surface engaging said balls,
   (k) said surface of said second ball race being provided with a plurality of annularly spaced depressions whereby a high frequency vibration is imparted to said balls during rotation thereof.

8. The device as defined in claim 7 and in which said depressions extend radially with respect to said surfaces of said second ball race and in which each of said depressions is arcuately formed about a radius bisecting said depression.

9. The device as defined in claim 7 and in which one of said depressions is provided for each of said balls.

10. The device as defined in claim 7 and in which each of said depressions in lateral section is in substantially the form of a portion of a sine curve.

11. A control mechanism comprising
   (a) a first ball race and a second ball race spaced from said first ball race and axially aligned therewith,
   (b) a plurality of centrifugal balls carried intermediate said ball races in engagement therewith,
   (c) means imparting rotation to said balls about a common axis,
   (d) said first ball race being provided with a dished surface engaging said balls whereby upon rotation of said balls said first ball race is moved away from said second ball race,
   (e) means preventing rotation of said second ball race,
   (f) said second ball race being provided with a surface engaging said balls, and
   (g) means being provided on said surface of said second ball race to impart a high frequency vibration to said balls during rotation thereof.

12. The device as defined in claim 11 and in which said last mentioned means comprises a plurality of annularly spaced depressions provided on said surface of said second ball race in the path of said balls.

13. A speed responsive device comprising
   (a) a housing,
   (b) a shaft rotatably carried in said housing, (c) a first ball race axially slidably carried on said shaft in a position spaced from said housing,
(d) a second ball race axially aligned with said first ball race and spaced therefrom,
(e) means securing said second ball race to said housing,
(f) a plurality of centrifugal balls carried intermediate said first and second ball races,
(g) a rotary drive member carried by said shaft and having radially extending arms engaging said balls,
(h) said first ball race having a dished surface,
(i) resilient means operable to urge said surface into engagement with said balls,
(j) said second ball race having a surface engaging said balls,
(k) said surface of said second ball race being provided with a plurality of radially extending, annularly spaced, arcuately formed depressions.

References Cited in the file of this patent

UNITED STATES PATENTS

| | | |
|---|---|---|
| 1,137,110 | Balough | Apr. 27, 1915 |
| 2,288,382 | Adler | June 30, 1942 |
| 2,598,960 | Adler | June 3, 1952 |
| 2,660,422 | Parker | Nov. 24, 1953 |